US009018332B2

(12) United States Patent
Okawa et al.

(10) Patent No.: US 9,018,332 B2
(45) Date of Patent: Apr. 28, 2015

(54) POLYORGANOSILOXANE CONTAINING METHACRYLOXY GROUP OR ACRYLOXY GROUP AND METHOD FOR PRODUCING THE SAME

(75) Inventors: Tadashi Okawa, Ichihara (JP); Eiji Ando, Yokohama (JP)

(73) Assignee: Dow Corning Toray Company, Ltd., Chiyoda-Ku, Tokyo (JP)

( * ) Notice: Subject to any disclaimer, the term of this patent is extended or adjusted under 35 U.S.C. 154(b) by 833 days.

(21) Appl. No.: 12/863,165

(22) PCT Filed: Jan. 14, 2009

(86) PCT No.: PCT/JP2009/000112
§ 371 (c)(1),
(2), (4) Date: Dec. 20, 2010

(87) PCT Pub. No.: WO2009/090870
PCT Pub. Date: Jul. 23, 2009

(65) Prior Publication Data
US 2011/0092660 A1    Apr. 21, 2011

(30) Foreign Application Priority Data
Jan. 15, 2008   (JP) ................. 2008-006270

(51) Int. Cl.
C08G 77/20    (2006.01)
C08G 77/38    (2006.01)
C08G 77/12    (2006.01)
C08G 77/46    (2006.01)

(52) U.S. Cl.
CPC ............... *C08G 77/38* (2013.01); *C08G 77/12* (2013.01); *C08G 77/46* (2013.01)

(58) Field of Classification Search
USPC ........................................................ 528/41
See application file for complete search history.

(56) References Cited

U.S. PATENT DOCUMENTS

| 5,039,761 | A | 8/1991 | Ono et al. | |
| 5,494,945 | A * | 2/1996 | Kidon et al. | 522/99 |
| 5,744,529 | A | 4/1998 | Butler et al. | |
| 6,471,952 | B1 | 10/2002 | Dubief et al. | |
| 2001/0043893 | A1 | 11/2001 | Okuyama et al. | |
| 2010/0105802 | A1 | 4/2010 | Kuboe et al. | |

FOREIGN PATENT DOCUMENTS

| EP | 0130731 A2 | 1/1985 |
| EP | 0152179 A2 | 8/1985 |
| JP | 60215009 A | 10/1985 |
| JP | 6150988 A | 3/1986 |
| JP | 06051795 B | 7/1994 |
| JP | 07053935 A | 2/1995 |
| JP | 07173178 A | 7/1995 |
| JP | 07287422 A | 10/1995 |
| JP | 08231857 A | 9/1996 |
| JP | 10512290 T | 11/1998 |
| JP | 2000-186122 | 7/2000 |
| JP | 2001-055446 A | 2/2001 |
| JP | 2001-098040 A | 4/2001 |
| JP | 2001-294666 A | 10/2001 |
| JP | 2004-189959 A | 7/2004 |
| JP | 2005-215274 A | 8/2005 |
| JP | 2005527666 A | 9/2005 |
| JP | 2006037109 A | 2/2006 |
| WO | WO 2008-093596 A1 | 8/2008 |

OTHER PUBLICATIONS

JP 2005 215274 Machine translation (2005).*
English language abstract for JP 60215009 extracted from espacenet.com database Nov. 16, 2010, 9 pages.
English language abstract for JP 61050988 extracted from espacenet.com database Nov. 16, 2010, 6 pages.
English language abstract for JP 6051795 extracted from espacenet.com database Nov. 16, 2010, 13 pages.
English language translation and abstract for JP 07-053935 extracted from PAJ database Nov. 16, 2010, 50 pages.
English language translation and abstract for JP 07-173178 extracted from PAJ database Nov. 16, 2010, 60 pages.
English language translation and abstract for JP 07-287422 extracted from PAJ database Nov. 16, 2020, 159 pages.
English language abstract for JP 8231857 extracted from espacenet.com database Nov. 16, 2010, 8 pages.
English language abstract for JP 10512290 extracted from espacenet.com database Nov. 16, 2010, 51 pages.
English language translation and abstract for JP 2000-186122 extracted from PAJ database Nov. 16, 2010, 37 pages.
English language translation and abstract for JP 2001-055446 extracted for PAJ database Nov. 19, 2010, 99 pages.
English language translation and abstract for JP 2001-098040 extracted for PAJ database Nov. 16, 2010, 56 pages.
English language abstract for JP 2001-294666 extracted from espacenet.com database Nov. 16, 2010, 9 pages.
English language translation and abstract for JP 2004-189959 extracted from PAJ database Nov. 16, 2010, 38 pages.

(Continued)

*Primary Examiner* — Kuo-Liang Peng
(74) *Attorney, Agent, or Firm* — Howard & Howard Attorneys PLLC

(57) ABSTRACT

A methacryloxy group- or acryloxy group-containing polyorganosiloxane in which a methacryloxy group or acryloxy group is bonded to a silicon atom in the polyorganosiloxane across a long-chain alkylene group or poly(alkyleneoxy)-long chain-alkylene group having 11 to 20 carbon atoms. A method of producing this methacryloxy group- or acryloxy group-containing polyorganosiloxane, in which a silicon-bonded hydrogen atom-containing polyorganosiloxane is addition reacted in the presence of a hydrosilylation reaction catalyst with a 1-alkenyl methacrylate or a 1-alkenyl acrylate or a 1-alkenyloxypolyalkylene glycol methacrylate or a 1-alkenyloxypolyalkylene glycol acrylate.

4 Claims, 4 Drawing Sheets

(56) References Cited

OTHER PUBLICATIONS

English language translation and abstract to JP 2005-215274 extracted from PAJ database Nov. 19, 2010, 46 pages.
English language translation and abstract for JP 2005-527666 extracted from espacenet.com & PAJ databases Nov. 16, 2010, 58 pages.
English language translation and abstract for JP 2006-037109 extracted from espacenet.com database Nov. 16, 2010, 111 pages.
English language abstract for WO 2008-093596 extracted from espacenet.com database Nov. 16, 2010, 34 pages.
PCT International Search Report for Application No. PCT/JP2009/000112 dated Apr. 14, 2009, 4 pages.

* cited by examiner

POLYORGANOSILOXANE CONTAINING METHACRYLOXY GROUP OR ACRYLOXY GROUP AND METHOD FOR PRODUCING THE SAME

RELATED APPLICATIONS

This application claims priority to and all the advantages of International Patent Application No. PCT/JP2009/000112, filed on Jan. 14, 2009, which claims priority to Japanese Patent Application No. JP 2008-006270, filed on Jan. 15, 2008.

TECHNICAL FIELD

The present invention relates to a methacryloxy group- or acryloxy group-containing polyorganosiloxane and more particularly relates to a methacryloxy group- or acryloxy group-containing polyorganosiloxane in which a methacryloxy group or acryloxy group is bonded to a silicon atom in the polyorganosiloxane across a long-chain alkylene group that contains at least 11 but not more than 20 carbon atoms or across a poly(alkyleneoxy)-long chain-alkylene group. The present invention further relates to a method of producing this methacryloxy group- or acryloxy group-containing polyorganosiloxane, said method being characterized by executing an addition reaction between a silicon-bonded hydrogen atom-containing polyorganosiloxane and a 1-alkenyl methacrylate or a 1-alkenyl acrylate in the presence of a hydrosilylation reaction catalyst, or by executing an addition reaction between a silicon-bonded hydrogen atom-containing polyorganosiloxane and a 1-alkenyloxypolyalkylene glycol methacrylate or a 1-alkenyloxypolyalkylene glycol acrylate in the presence of a hydrosilylation reaction catalyst.

BACKGROUND ART

Within the sphere of (meth)acryloxy group-containing polyorganosiloxanes in which the (meth)acryloxy group, i.e., the methacryloxy group or the acryloxy group, is bonded to a silicon atom in a polyorganosiloxane across an alkylene group, polyorganosiloxanes are already known in which the alkylene group is methylene, propylene, or butylene.

Patent Reference 1 (JP 06-051795 B, U.S. Pat. No. 5,039, 761) discloses a polydimethylsiloxane in which the methacryloxy group is bonded to the main chain via the propylene group, while Patent Reference 2 (JP 60-215009 A, U.S. Pat. No. 4,675,346) discloses a polydiorganosiloxane in which the (meth)acryloxy group is bonded across the propylene group to the silicon at both terminals.

A polyorganosiloxane in which the (meth)acryloxy group is bonded via the methylene group is reported in Nonpatent Reference 1 (Journal of Organic Chemistry (1961), 26, 5180-5182), while a polyorganosiloxane in which the (meth)acryloxy group is bonded via the butylene group is reported in Nonpatent Reference 2 (Neth. Appl. (1979), 40 pp CODEN: NAXXAN NL 7807833 19790129) and in Nonpatent Reference 3 (Zhurnal Obshchei Khimii (1979), 49 (10), 2250-4).

In addition, within the sphere of polyorganosiloxanes in which the methacryloxy group is bonded to silicon therein across an alkyleneoxyalkylene group, Patent Reference 3 (JP 61-050988 A) discloses a polyorganosiloxane in which this bonding occurs across an ethyleneoxypropylene group, while Patent Reference 4 (JP 08-231857 A) discloses a polyorganosiloxane in which this bonding occurs across a polyalkyleneoxyalkylene group wherein the alkylene group has 2 to 5 carbon atoms, although the examples here concern only polyorganosiloxanes in which this bonding occurs across a polyethyleneoxypropylene group. That is, polyorganosiloxane whose synthesizability is demonstrated by the examples is limited to polyorganosiloxane in which the methacryloxy group is bonded therein across the polyethyleneoxypropylene group.

On the other hand, within the sphere of monomers that can be used in a vinyl-type copolymerization, Patent Reference 5 (JP 10-512290 A, WO 1997/012588) discloses a macromonomer in which the (meth)acryloxy group is bonded to the silicon atom at one terminal of a polydimethylsiloxane by an alkylene group having 2 to 6 carbon atoms or alkyleneoxy group having 2 to 6 carbon atoms, but no description whatever of a method of producing this macromonomer is provided in Patent Reference 5.

Patent Reference 6 (JP 2000-186122 A, U.S. Pat. No. 6,090,902) discloses, again as a monomer that can be used in a vinyl-type copolymerization, a macromonomer in which the methacryloxy group is bonded to the silicon atom at one terminal of a polydimethylsiloxane across an alkylene group having 2 to 4 carbon atoms, but the synthesis examples here concern only macromonomer in which the methacryloxy group is bonded to the silicon at one terminal of a polydimethylsiloxane across the propylene group.

Patent Reference 7 (JP 2005-527666 A, WO 2003/085035) discloses, again as a monomer that can be used in a vinyl-type copolymerization, a macromonomer in which the methacryloxy group or acryloxy group is bonded to the silicon atom at one terminal of a polydimethylsiloxane via the propylene group, but no description whatever of a method of producing this macromonomer is provided in Patent Reference 7.

Patent Reference 8 (JP 2006-037109 A, FR 2873702 A1, EP 1621560 A1) discloses, again as a monomer that can be used in a vinyl-type copolymerization, a macromonomer in which the (meth)acryloxy group is bonded to the silicon atom at one terminal of a polydimethylsiloxane via an alkylene group having 1 to 10 carbon atoms that may contain one or two ether linkages, but no description whatever of a method of producing this macromonomer is provided in Patent Reference 8.

As described above, the preceding patent documents do not teach a macromonomer in which the (meth)acryloxy group, i.e., the methacryloxy group or acryloxy group, is bonded to the silicon atom at one terminal of a polydimethylsiloxane via a long-chain alkylene wherein the alkylene group that has at least 11 carbon atoms, and such a macromonomer has not appeared in a printed publication.

On the other hand, the preceding patent documents do not teach a macromonomer in which the (meth)acryloxy group, i.e., the methacryloxy group or acryloxy group, is bonded to the silicon atom at one terminal of a polydimethylsiloxane via a polyalkyleneoxyalkylene group wherein the total number of carbon atoms in both alkylene groups is at least 11, and such a macromonomer has not appeared in a printed publication.

[Patent Reference 1] JP 06-051795 B, U.S. Pat. No. 5,039, 761
[Patent Reference 2] JP 60-215009 A, U.S. Pat. No. 4,675, 346
[Patent Reference 3] JP 61-050988 A
[Patent Reference 4] JP 08-231857 A
[Patent Reference 5] JP 10-512290 A, WO 1997/012588
[Patent Reference 6] JP 2000-186122 A, U.S. Pat. No. 6,090, 902
[Patent Reference 7] JP 2005-527666 A, WO 2003/085035
[Patent Reference 8] JP 2006-037109 A, FR 2873702 A1, EP 1621560 A1

[Nonpatent Reference 1] Journal of Organic Chemistry (1961), 26, 5180-5182
[Nonpatent Reference 2] Neth. Appl. (1979), 40 pp CODEN: NAXXAN NL 7807833 19790129
[Nonpatent Reference 3] Zhurnal Obshchei Khimii (1979), 49(10), 2250-2254

Methacryloxy group- or acryloxy group-containing polyorganosiloxanes are commonly used for the modification of various types of thermoplastic resins by the incorporation into the thermoplastic resin of the copolymer provided by copolymerization of such a polyorganosiloxane with another vinylic monomer utilizing the vinylic polymerizability of the methacryloxy group or acryloxy group. With regard to the methacryloxy group- or acryloxy group-containing polyorganosiloxanes that have generally been used for this copolymerization with another vinylic monomer, the present inventor recognized that the polysiloxanyl group, which is the group that provides the resin-modifying effect, has had a low degree of freedom in the thermoplastic resin because the methacryloxy group or acryloxy group, which is the vinylically polymerizable moiety, has been bonded to the polysiloxanyl group across the short propylene group, and further recognized that this causes the problem of an unsatisfactory surface segregation by the polysiloxanyl group.

DISCLOSURE OF THE INVENTION

Problems to be Solved by the Invention

As a consequence, the present inventor carried out intensive investigations into a novel methacryloxy group- or acryloxy group-containing polyorganosiloxane in which a methacryloxy group or acryloxy group is bonded to a silicon atom in the polyorganosiloxane across a long-chain alkylene group or a poly(alkyleneoxy)-long chain-alkylene group, into a method of producing this novel methacryloxy group- or acryloxy group-containing polyorganosiloxane, into a novel methacryloxy group- or acryloxy group-containing polyorganosiloxane that provides an excellent resin-modifying effect when copolymerized with another vinylic monomer, and into a high-productivity method for producing this polyorganosiloxane. The present inventor achieved the present invention as a result of these investigations.

An object of the present invention is to provide a novel methacryloxy group- or acryloxy group-containing polyorganosiloxane in which a methacryloxy group or acryloxy group is bonded to a silicon atom in the polyorganosiloxane across a long-chain alkylene group or a poly(alkyleneoxy)-long chain-alkylene group. A further object of the present invention is to provide a method of producing this novel methacryloxy group- or acryloxy group-containing polyorganosiloxane. Additional objects of the present invention are to provide a novel methacryloxy group- or acryloxy group-containing polyorganosiloxane that provides an excellent resin-modifying effect when copolymerized with another vinylic monomer and to provide a high-productivity method for producing this polyorganosiloxane.

Means Solving the Problems

The objects cited above are achieved by a polyorganosiloxane in which a methacryloxy group or acryloxy group is bonded to a silicon atom therein across an alkylene group wherein the alkylene group contains at least 11 carbon atoms, by a hydrosilylation reaction-based method of producing this polyorganosiloxane, by a polyorganosiloxane in which a methacryloxy group or acryloxy group is bonded to a silicon atom therein across a poly(alkyleneoxy)alkylene group wherein the total number of carbon atoms in the alkylene groups is at least 11, and by a hydrosilylation reaction-based method of producing this polyorganosiloxane.

The present invention relates to

"[1] A methacryloxyalkyl group- or acryloxyalkyl group-containing polyorganosiloxane that is represented by the average unit formula (1)

wherein $R^1$ is a methacryloxyalkyl group or acryloxyalkyl group represented by general formula (2)

wherein X is a methacryloxy group or acryloxy group and Z is a divalent alkylene group having 11 to 20 carbon atoms; $R^2$ is a monovalent hydrocarbyl group that does not contain an aliphatically unsaturated bond; a is $0.001 \leq a \leq 1.5$; b is $1.0 \leq b \leq 2.5$; and $1.001 \leq a+b \leq 3$.

[2] The methacryloxyalkyl group- or acryloxyalkyl group-containing polyorganosiloxane according to [1], wherein Z in general formula (2) is an undecylene group.

[2-1] The methacryloxyalkyl group- or acryloxyalkyl group-containing polyorganosiloxane according to [2], wherein $R^2$ in the average unit formula (1) is a methyl group.

[3] The methacryloxyalkyl group- or acryloxyalkyl group-containing polyorganosiloxane according to [1], wherein the methacryloxyalkyl group- or acryloxyalkyl group-containing polyorganosiloxane represented by the average unit formula (1) has the average structural formula (3)

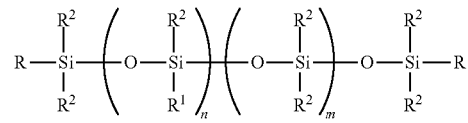

wherein $R^1$ is a methacryloxyalkyl group or acryloxyalkyl group represented by general formula (2)

wherein X is a methacryloxy group or acryloxy group and Z is an alkylene group having 11 to 20 carbon atoms; $R^2$ is a monovalent hydrocarbyl group that does not contain an aliphatically unsaturated bond; R is $R^1$ or $R^2$; R is $R^1$ when n is 0; n is a number greater than or equal to 0 and less than or equal to 50; and m is a number greater than or equal to 1 and less than or equal to 10,000.

[4] The methacryloxyalkyl group- or acryloxyalkyl group-containing polyorganosiloxane according to [3], wherein Z in general formula (2) is an undecylene group.

[4-1] The methacryloxyalkyl group- or acryloxyalkyl group-containing polyorganosiloxane according to [4], wherein $R^2$ in the average structural formula (3) is a methyl group."

The present invention further relates to

"[5] A method of producing a methacryloxyalkyl group- or acryloxyalkyl group-containing polyorganosiloxane represented by the average unit formula (1)

wherein $R^1$ is a methacryloxyalkyl group or acryloxyalkyl group represented by general formula (2)

wherein X is a methacryloxy group or acryloxy group and Z is an alkylene group having 11 to 20 carbon atoms; $R^2$ is a monovalent hydrocarbyl group that does not contain an aliphatically unsaturated bond; a is 0.001≤a≤1.5; b is 1.0≤b≤2.5; and 1.001≤a+b≤3, said method being characterized by executing an addition reaction between a silicon-bonded hydrogen atom-containing polyorganosiloxane represented by the average unit formula (4)

wherein $R^2$ is a monovalent hydrocarbyl group that does not contain an aliphatically unsaturated bond, a is 0.001≤a≤1.5, b is 1.0≤b≤2.5, and 1.001≤a+b≤3 and a 1-alkenyl methacrylate or 1-alkenyl acrylate represented by general formula (5)

wherein X is a methacryloxy group or acryloxy group and W is a 1-alkenyl group having 11 to 20 carbon atoms in the presence of a hydrosilylation reaction catalyst.

[6] The method according to [5] for producing a methacryloxyalkyl group- or acryloxyalkyl group-containing polyorganosiloxane, wherein W in general formula (5) is a 1-undecenyl group and Z in general formula (2) is an undecylene group.

[6-1] The method according to [6] of producing a methacryloxyalkyl group- or acryloxyalkyl group-containing polyorganosiloxane, wherein $R^2$ in the average unit formula (4) and the average unit formula (1) is a methyl group.

[7] The method according to [5] for producing a methacryloxyalkyl group- or acryloxyalkyl group-containing polyorganosiloxane, wherein the silicon-bonded hydrogen atom-containing polyorganosiloxane represented by the average unit formula (4) has the average structural formula (6)

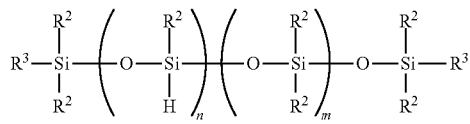

wherein $R^2$ is a monovalent hydrocarbyl group that does not contain an aliphatically unsaturated bond, $R^3$ is $R^2$ or a hydrogen atom, $R^3$ is a hydrogen atom when n is 0, n is a number greater than or equal to 0 and less than or equal to 50, and m is a number greater than or equal to 1 and less than or equal to 10,000, and the methacryloxyalkyl group- or acryloxyalkyl group-containing polyorganosiloxane represented by the average unit formula (1) has the average structural formula (3)

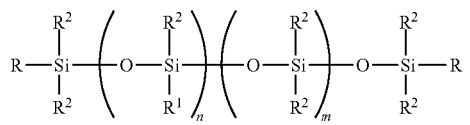

wherein $R^1$ is a methacryloxy methacryloxyalkyl group or acryloxyalkyl group represented by general formula (2)

wherein X is a methacryloxy group or acryloxy group and Z is an alkylene group having 11 to 20 carbon atoms; $R^2$ is a monovalent hydrocarbyl group that does not contain an aliphatically unsaturated bond; R is $R^1$ or $R^2$; R is $R^1$ when n is 0; n is a number greater than or equal to 0 and less than or equal to 50; and m is a number greater than or equal to 1 and less than or equal to 10,000.

[8] The method according to [7] for producing a methacryloxyalkyl group- or acryloxyalkyl group-containing polyorganosiloxane, wherein Z in general formula (2) is an undecylene group.

[8-1] The method according to [8] for producing a methacryloxyalkyl group- or acryloxyalkyl group-containing polyorganosiloxane, wherein $R^2$ in the average structural formula (6) and the average structural formula (3) is a methyl group."

The present invention further relates to

"[9] A methacryloxy or acryloxy-poly(alkyleneoxy)alkyl group-containing polyorganosiloxane that is represented by the average unit formula (7)

wherein $R^4$ is a methacryloxy or acryloxy-poly(alkyleneoxy)alkyl group represented by general formula (8)

wherein X is a methacryloxy group or acryloxy group, Y is an alkyleneoxy group having 2 to 6 carbon atoms, c is a number greater than or equal to 1 and less than or equal to 20, and $Z^1$ is a divalent alkylene group having 6 to 20 carbon atoms, with the proviso that the total number of carbon atoms in $(Y)_c$—$Z^1$ is at least 11; $R^2$ is a monovalent hydrocarbyl group that does not contain an aliphatically unsaturated bond; a is 0.001≤a≤1.5; b is 1.0≤b≤2.5; and 1.001≤a+b≤3.

[10] The methacryloxy or acryloxy-poly(alkyleneoxy)alkyl group-containing polyorganosiloxane according to [9], wherein Y in general formula (8) is an ethyleneoxy group and $Z^1$ is an undecylene group.

[10-1] The methacryloxy or acryloxy-poly(alkyleneoxy) alkyl group-containing polyorganosiloxane according to [10], wherein $R^2$ in the average unit formula (7) is a methyl group.

[11] The methacryloxy or acryloxy-poly(alkyleneoxy)alkyl group-containing polyorganosiloxane according to [10], wherein the methacryloxy or acryloxy-poly(alkyleneoxy) alkyl group-containing polyorganosiloxane represented by the average unit formula (7) has the average structural formula (9)

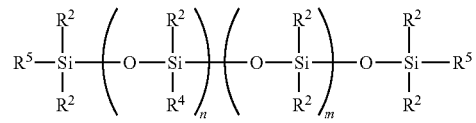

wherein $R^4$ is a methacryloxy or acryloxy-poly(alkyleneoxy) alkyl group represented by general formula (8)

wherein X is a methacryloxy group or acryloxy group, Y is an alkyleneoxy group having 2 to 6 carbon atoms, c is a number greater than or equal to 1 and less than or equal to 20, and $Z^1$ is an alkylene group having 6 to 20 carbon atoms, with the proviso that the total number of carbon atoms in $(Y)_c$—$Z^1$ is at least 11; $R^5$ is $R^2$ or $R^4$; $R^5$ is $R^4$ when n is 0; n is a number greater than or equal to 0 and less than or equal to 50; and m is a number greater than or equal to 1 and less than or equal to 10,000.

[12] The methacryloxypoly(alkyleneoxy)alkyl group- or acryloxypoly(alkyleneoxy)alkyl group-containing polyorganosiloxane according to [11], wherein Y in general formula (8) is an ethyleneoxy group and $Z^1$ is an undecylene group.

[12-1] The methacryloxy or acryloxy-poly(alkyleneoxy) alkyl group-containing polyorganosiloxane according to [12], wherein $R^2$ in the average structural formula (9) is a methyl group.".

The present invention further relates to

"[13] A method of producing a methacryloxy or acryloxy-poly(alkyleneoxy)alkyl group-containing polyorganosiloxane represented by the average unit formula (7)

$$R^4{}_a R^2{}_b SiO_{(4-a-b)/2} \quad (7)$$

wherein $R^4$ is a methacryloxy or acryloxy-poly(alkyleneoxy) alkyl group represented by general formula (8)

$$X-(Y)_c-Z^1- \quad (8)$$

wherein X is a methacryloxy group or acryloxy group, Y is an alkyleneoxy group having 2 to 6 carbon atoms, c is a number greater than or equal to 1 and less than or equal to 20, and $Z^1$ is a divalent alkylene group having 6 to 20 carbon atoms, with the proviso that the total number of carbon atoms in $(Y)_c-Z^1$ is at least 11; $R^2$ is a monovalent hydrocarbyl group that does not contain an aliphatically unsaturated bond; a is 0.001≤a≤1.5; b is 1.0≤b≤2.5; and 1.001≤a+b≤3, characterized by executing an addition reaction between
a silicon-bonded hydrogen atom-containing polyorganosiloxane represented by the average unit formula (4)

$$R^2{}_a H_b SiO_{(4-a-b)/2} \quad (4)$$

wherein $R^2$ is a monovalent hydrocarbyl group that does not contain an aliphatically unsaturated bond, a is 0.001≤a≤1.5, b is 1.0≤b≤2.5, and 1.001≤a+b≤3 and
a 1-alkenyloxypolyalkylene glycol methacrylate or 1-alkenyloxypolyalkylene glycol acrylate represented by general formula (10)

$$X-(Y)_c-W^1 \quad (10)$$

wherein X is a methacryloxy group or acryloxy group, Y is an alkyleneoxy group having 2 to 6 carbon atoms, c is a number greater than or equal to 1 and less than or equal to 20, $W^1$ is a 1-alkenyl group having 6 to 20 carbon atoms, and the total number of carbon atoms in $(Y)_c-W^1$ is at least 11 in the presence of a hydrosilylation reaction catalyst.

[14] The method according to [13] for producing a methacryloxy or acryloxy-poly(alkyleneoxy)alkyl group-containing polyorganosiloxane, wherein $W^1$ in general formula (10) is a 1-undecenyl group, Y in general formulas (8) and (10) is an ethyleneoxy group, and $Z^1$ in general formula (8) is an undecylene group.

[14-1] The method according to [14] for producing a methacryloxy or acryloxy-poly(alkyleneoxy)alkyl group-containing polyorganosiloxane, wherein $R^2$ in the average unit formulas (4) and (7) is a methyl group.

[15] The method according to [13] for producing a methacryloxy or acryloxy-poly(alkyleneoxy)alkyl group-containing polyorganosiloxane, wherein
the silicon-bonded hydrogen atom-containing polyorganosiloxane represented by the average unit formula (4) has the average structural formula (6)

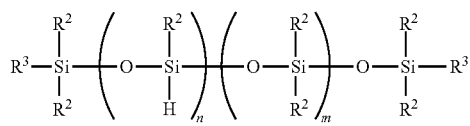

wherein $R^2$ is a monovalent hydrocarbyl group that does not contain an aliphatically unsaturated bond, $R^3$ is $R^2$ or a hydrogen atom, $R^3$ is a hydrogen atom when n is 0, n is a number greater than or equal to 0 and less than or equal to 50, and m is a number greater than or equal to 1 and less than or equal to 10,000, and
the methacryloxy or acryloxy-poly(alkyleneoxy)alkyl group-containing polyorganosiloxane represented by the average unit formula (7) has the average structural formula (9)

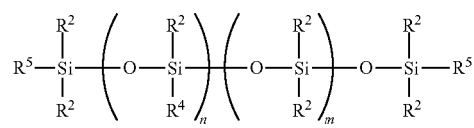

wherein $R^4$ is a methacryloxy or acryloxy-poly(alkyleneoxy)alkyl group represented by general formula (8)

$$X-(Y)_c-Z^1- \quad (8)$$

wherein X is a methacryloxy group or acryloxy group, Y is an alkyleneoxy group having 2 to 6 carbon atoms, c is a number greater than or equal to 1 and less than or equal to 20, and $Z^1$ is an alkylene group having 6 to 20 carbon atoms, with the proviso that the total number of carbon atoms in $(Y)_c-Z^1$ is at least 11; $R^2$ is a monovalent hydrocarbyl group that does not contain an aliphatically unsaturated bond; $R^5$ is $R^2$ or $R^4$; $R^5$ is $R^4$ when n is 0; n is a number greater than or equal to 0 and less than or equal to 50; and m is a number greater than or equal to 1 and less than or equal to 10,000.

[16] The method according to [15] for producing a methacryloxy or acryloxy-poly(alkyleneoxy)alkyl group-containing polyorganosiloxane, wherein Y in general formula (8) is an ethyleneoxy group and $Z^1$ is an undecylene group.

[16-1] The method according to [16] for producing a methacryloxy or acryloxy-poly(alkyleneoxy)alkyl group-containing polyorganosiloxane, wherein $R^2$ in the average structural formulas (6) and (9) is a methyl group."

Effects of the Invention

The methacryloxyalkyl group- or acryloxyalkyl group-containing polyorganosiloxane of the present invention and the methacryloxy or acryloxy-poly(alkyleneoxy)alkyl group-containing polyorganosiloxane of the present invention are useful as monomers for copolymerization with another vinylic monomer, and the resulting copolymer with another vinylic monomer is useful as an internal modifying agent for resins and particularly thermoplastic resins.

These polyorganosiloxanes can be easily and efficiently produced by the method of the present invention for producing a methacryloxyalkyl group- or acryloxyalkyl group-containing polyorganosiloxane and the method of the present invention for producing a methacryloxy or acryloxy-poly(alkyleneoxy)alkyl group-containing polyorganosiloxane.

BEST MODE FOR CARRYING OUT THE INVENTION

Figure 1:
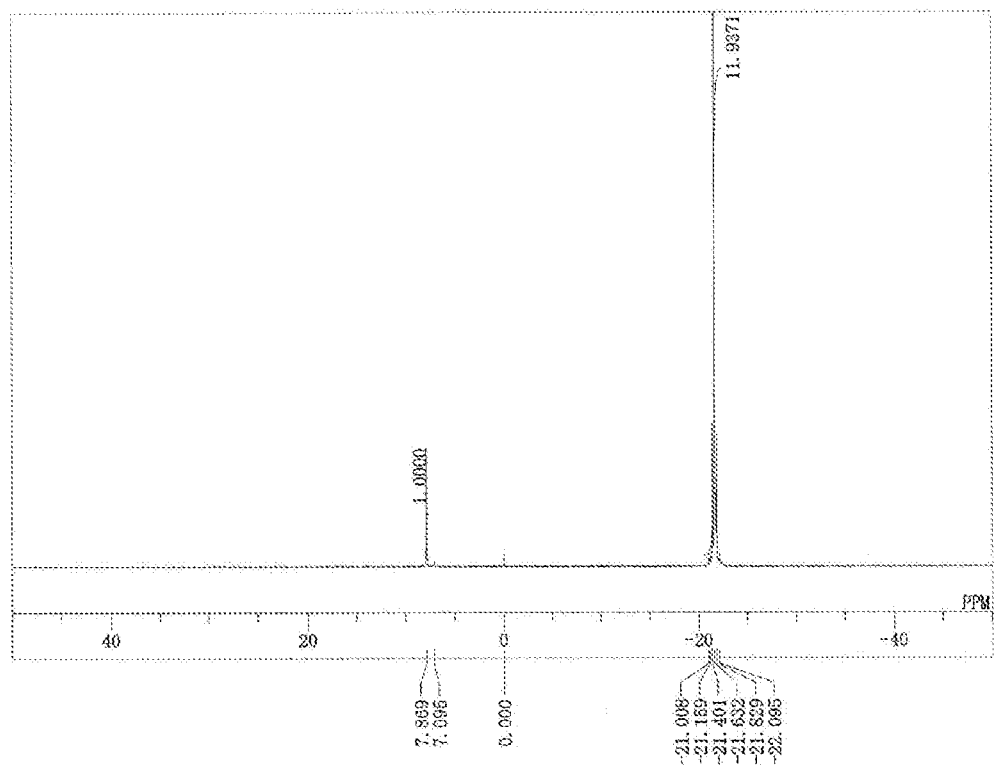
FIG. 1 is a $^{29}$Si-NMR chart of the polydimethylsiloxane obtained in Example 1, in which the methacryloxytetra(ethyleneoxy)undecyl group is bonded at both terminals.
Figure 2:
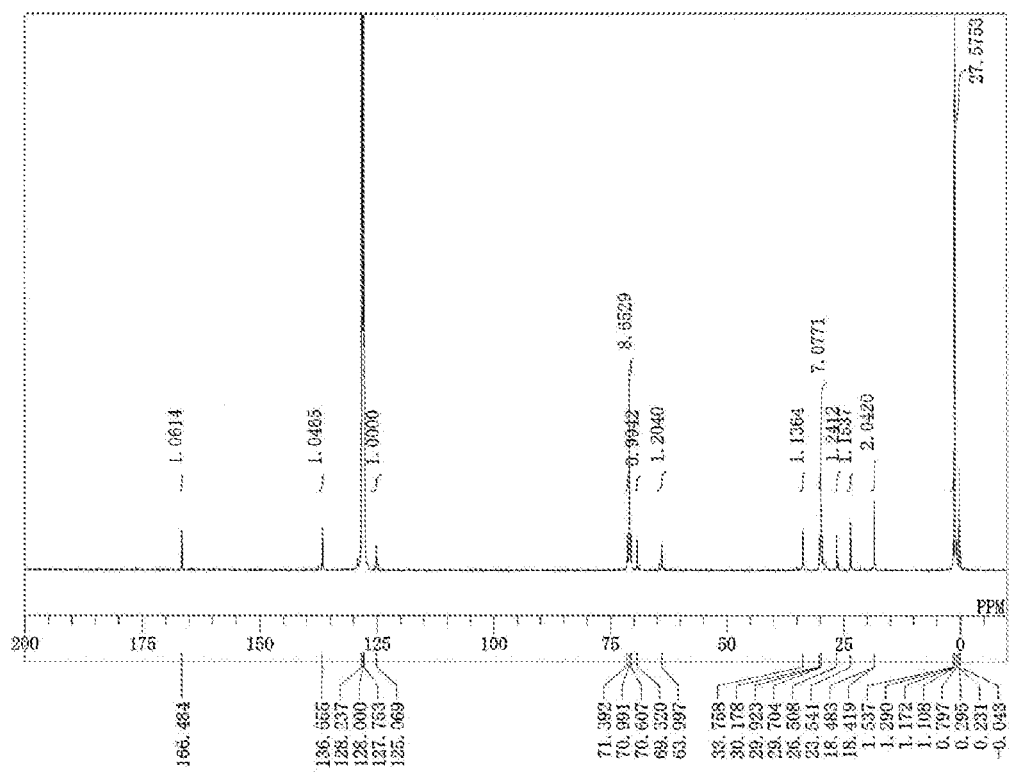
FIG. 2 is a $^{13}$C-NMR chart of the polydimethylsiloxane obtained in Example 1, in which the methacryloxytetra(ethyleneoxy)undecyl group is bonded at both terminals.
Figure 3:
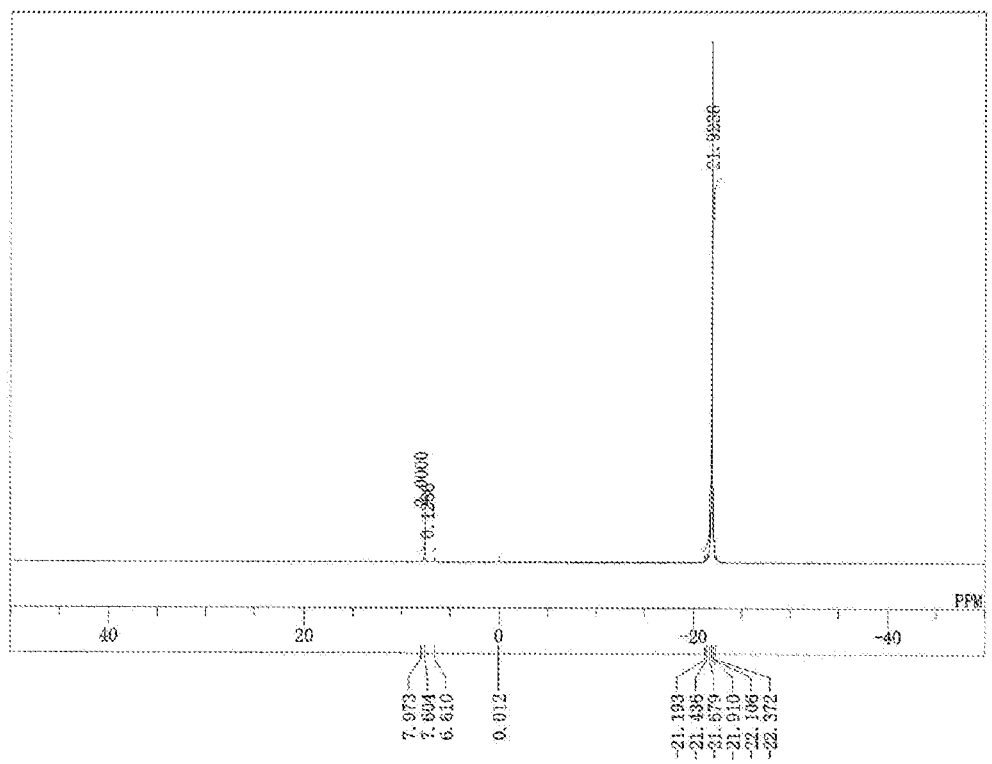
FIG. 3 is a $^{29}$Si-NMR chart of the polydimethylsiloxane obtained in Example 2, in which the methacryloxyundecyl group is bonded at both terminals.
Figure 4:
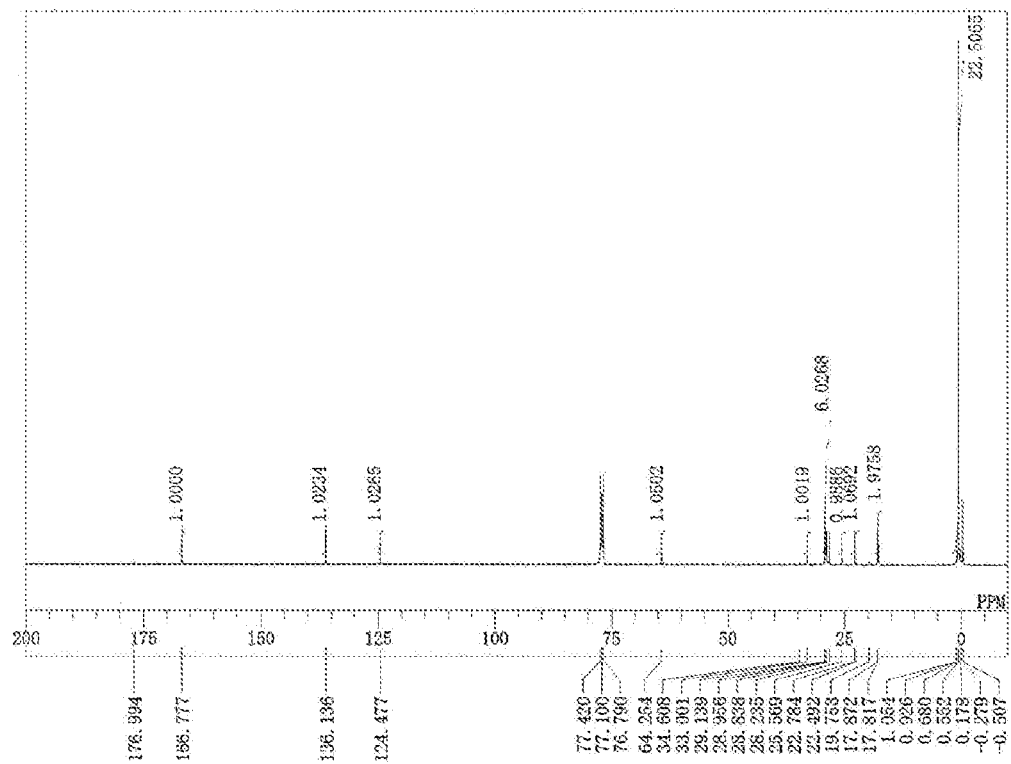
FIG. 4 is a $^{13}$C-NMR chart of the polydimethylsiloxane obtained in Example 2, in which the methacryloxyundecyl group is bonded at both terminals.

The methacryloxyalkyl group- or acryloxyalkyl group-containing polyorganosiloxane of the present invention is characteristically represented by the average unit formula (1)

$$R^1_a R^2_b SiO_{(4-a-b)/2} \quad (1)$$

wherein $R^1$ is a methacryloxyalkyl group or acryloxyalkyl group represented by general formula (2)

$$X-Z- \quad (2)$$

wherein X is a methacryloxy group or acryloxy group and Z is a divalent alkylene group having 11 to 20 carbon atoms; $R^2$ is a monovalent hydrocarbyl group that does not contain an aliphatically unsaturated bond; a is $0.001 \le a \le 1.5$; b is $1.0 \le b \le 2.5$; and $1.001 \le a+b \le 3$.

$R^1$ in the average unit formula (1) is a silicon-bonded methacryloxyalkyl group or silicon-bonded acryloxyalkyl group represented by general formula (2)

$$X-Z- \quad (2)$$

wherein X is a methacryloxy group or acryloxy group and Z is a divalent alkylene group having 11 to 20 carbon atoms.

Z is an alkylene group having 11 to 20 carbon atoms. The molecular configuration of this alkylene group is preferably a straight-chain configuration, but may be a branched-chain configuration.

This alkylene group can be exemplified by undecylene, dodecylene, tridecylene, tetradecylene, pentadecylene, hexadecylene, heptadecylene, octadecylene, nonadecylene, and eicosanylene. The undecylene group is preferred from the standpoint of the ease of acquisition of the synthesis starting materials.

$R^2$ is a silicon-bonded monovalent hydrocarbyl group that does not contain an aliphatically unsaturated bond. This monovalent hydrocarbyl group lacking an aliphatically unsaturated bond can be exemplified by alkyl groups such as methyl, ethyl, propyl, butyl, hexyl, and so forth; aryl groups such as phenyl, tolyl, xylyl, and so forth; and aralkyl groups such as benzyl, phenethyl, phenylpropyl, and so forth. Phenyl group and alkyl groups are preferred from the perspective of the ease of production of the polyorganosiloxane with the average unit formula (1) and from the perspective of the resin-modifying effect of the copolymer with another vinylic monomer, while alkyl groups are preferred thereamong and the methyl group is most preferred.

a is $0.001 \le a \le 1.5$; b is $1.0 \le b \le 2.5$; and $1.001 \le a+b \le 3$. The $0.001 \le a \le 1.5$ means that on average at least one $R^1$ is bonded per 1,000 silicon atoms in the polyorganosiloxane and that on average not more than 1.5 $R^1$ groups are bonded per silicon atom in the polyorganosiloxane. The $1.0 \le b \le 2.5$ means that on average at least one $R^2$ is bonded per silicon atom in the polyorganosiloxane and that on average not more than 2.5 $R^2$ groups are bonded per silicon atom in the polyorganosiloxane. The $1.001 \le a+b \le 3$ means that on average at least 1.001 $R^1$ and $R^2$ groups are bonded per silicon atom in the polyorganosiloxane and that on average not more than 3.0 $R^1$ and $R^2$ groups are bonded per silicon atom in the polyorganosiloxane. The polyorganosiloxane has a straight-chain molecular structure when a+b=2, and it is a dimer when a+b=3. The degree of branching in the polyorganosiloxane grows larger as a+b declines from 2 to 1, and a polysilsesquioxane is obtained at a+b=1. Viewed from the perspective of the copolymerizability with another vinylic monomer and the resin-modifying effect of the copolymer with another vinylic monomer, a is less than or equal to b and $1.7 \le a+b \le 3.0$ is preferred and $1.9 \le a+b \le 3.0$ is more preferred.

The molecular structure of this polyorganosiloxane represented by the average unit formula (1) is not particularly limited and may be straight chain, a moderately branched straight chain, branched, or cyclic, while a straight-chain structure represented by the following average structural formula (3) is preferred from the standpoint of the resin-modifying effect of the copolymer with another vinylic monomer

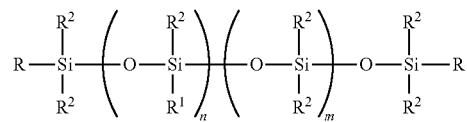

wherein $R^1$ is a methacryloxyalkyl group or acryloxyalkyl group represented by general formula (2)

$$X-Z- \quad (2)$$

wherein X is a methacryloxy group or acryloxy group and Z is a divalent alkylene group having 11 to 20 carbon atoms; $R^2$ is a monovalent hydrocarbyl group that does not contain an aliphatically unsaturated bond; R is $R^1$ or $R^2$; R is $R^1$ when n is 0; n is a number greater than or equal to 0 and less than or equal to 50; and m is a number greater than or equal to 1 and less than or equal to 10,000.

n in the average structural formula (3) is a number greater than or equal to 0 and less than or equal to 50, and is preferably from 1 to 3 from the standpoint of the resin-modifying effect of the copolymer with another vinylic monomer. m is a number greater than or equal to 1 and less than or equal to 10,000, and, viewed from the perspective of the ease of production of the starting silicon-bonded hydrogen atom-containing polyorganosiloxane, m is preferably greater than or equal to 1 and less than or equal to 1,000 and more preferably is greater than or equal to 1 and less than or equal to 100.

When n is 0 and the two R groups at the two terminals are both $R^1$, the methacryloxy group- or acryloxy group-containing polyorganosiloxane is then a polydiorganosiloxane in which a methacryloxyalkyl group or acryloxyalkyl group is bonded at both terminals. When n is greater than or equal to 1 and less than or equal to 50, the methacryloxy group- or acryloxy group-containing polyorganosiloxane is then a polydiorganosiloxane in which a methacryloxyalkyl group or acryloxyalkyl group is bonded at least in side chain position.

When n in the average structural formula (3) is 0 and one of the two R groups at the two terminals is $R^1$ and the other is $R^2$, the methacryloxy group- or acryloxy group-containing polyorganosiloxane is then a macromonomer having the form of a polydiorganosiloxane in which a methacryloxyalkyl group or acryloxyalkyl group is bonded at one terminal and is one species of the polyorganosiloxane represented by the average unit formula (1).

Viewed from the perspective of the resin-modifying effect of the copolymer with another vinylic monomer, the polydiorganosiloxane in which a methacryloxyalkyl group or acryloxyalkyl group is bonded at both terminals and the polydiorganosiloxane in which a methacryloxyalkyl group or acryloxyalkyl group is bonded at least in side chain position are preferred.

The method of the present invention for producing the methacryloxyalkyl group- or acryloxyalkyl group-containing polyorganosiloxane represented by the average unit formula (1) is characterized by executing an addition reaction between a silicon-bonded hydrogen atom-containing polyorganosiloxane represented by the average unit formula (4)

$$R^2{}_aH_bSiO_{(4-a-b)/2} \quad (4)$$

wherein $R^2$ is a monovalent hydrocarbyl group that does not contain an aliphatically unsaturated bond, a is $0.001 \leq a \leq 1.5$, b is $1.0 \leq b \leq 2.5$, and $1.001 \leq a+b \leq 3$ and a 1-alkenyl methacrylate or 1-alkenyl acrylate represented by general formula (5)

$$X\text{---}W \quad (5)$$

wherein X is a methacryloxy group or acryloxy group and W is a 1-alkenyl group having 11 to 20 carbon atoms in the presence of a hydrosilylation reaction catalyst.

A polyorganosiloxane in which the methacryloxyalkyl group or acryloxyalkyl group represented by the general formula X—Z— is bonded to a silicon atom therein, i.e., the polyorganosiloxane with the average unit formula (1), is produced by the addition reaction between the silicon-bonded hydrogen atom in the polyorganosiloxane with the average unit formula (4) and the 1-alkenyl methacrylate or 1-alkenyl acrylate represented by general formula (5).

$R^2$ is a monovalent hydrocarbyl group that does not contain an aliphatically unsaturated bond, and its specific and preferred examples are as already described for $R^2$ in the average unit formula (1).

The group W in X—W is a 1-alkenyl group having 11 to 20 carbon atoms, and its molecular configuration is preferably straight chain, but may also be a branched configuration. The group W can be exemplified by 1-undecenyl, 1-dodecenyl, 1-tridecenyl, 1-tetradecenyl, 1-pentadecenyl, 1-hexadecenyl, 1-heptadecenyl, 1-octadecenyl, 1-nonadecenyl, and 1-eicosenyl. The group W is preferably the 1-undecenyl group from the standpoint of ease of acquisition of a 1-alkenyl methacrylate or 1-alkenyl acrylate.

The silicon-bonded hydrogen atom-containing polyorganosiloxane with the average unit formula (4) is a starting material for the methacryloxyalkyl group- or acryloxyalkyl group-containing polyorganosiloxane with the average unit formula (1), and its molecular structure, which is therefore the same as the latter, is not particularly limited and may be straight chain, a moderately branched straight chain, branched, or cyclic, but is preferably straight chain from the perspective of the resin-modifying effect of the copolymer with another vinylic monomer.

The methacryloxy group- or acryloxy group-containing polyorganosiloxane with the average structural formula (3) can be produced using, as the silicon-bonded hydrogen atom-containing polyorganosiloxane with the average unit formula (4), a straight-chain silicon-bonded hydrogen atom-containing polyorganosiloxane represented by the following average structural formula (6)

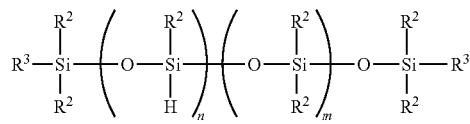

wherein $R^2$ is a monovalent hydrocarbyl group that does not contain an aliphatically unsaturated bond, $R^3$ is $R^2$ or a hydrogen atom, $R^3$ is a hydrogen atom when n is 0, n is a number greater than or equal to 0 and less than or equal to 50, and m is a number greater than or equal to 1 and less than or equal to 10,000.

$R^2$ here is described as for the $R^2$ in the average unit formula (1). n and m are as described for the n and m in the average structural formula (3). $R^3$ is $R^2$ or a hydrogen atom. $R^3$ is a hydrogen atom when n is 0.

This silicon-bonded hydrogen atom-containing polyorganosiloxane has at least two silicon-bonded hydrogen atoms in the molecule. The bonding position for the silicon-bonded hydrogen atoms is not particularly limited and can be exemplified by molecular chain terminal position, side chain position, and both positions. The content of the silicon-bonded hydrogen atoms is preferably 0.005 to 1.7 weight % and more preferably is 0.01 to 1.5 weight %.

The silicon-bonded hydrogen atom-containing polyorganosiloxane with the average unit formula (4) that has the straight-chain structure with the average structural formula (6) can be specifically exemplified by methylhydrogenpolysiloxane endblocked by trimethylsiloxy groups at both terminals, dimethylsiloxane.methylhydrogensiloxane copolymer endblocked by trimethylsiloxy groups at both terminals, polydimethylsiloxane endblocked by dimethylhydrogensiloxy groups at both terminals, and dimethylsiloxane.methylhydrogensiloxane copolymer endblocked by dimethylhydrogensiloxy groups at both terminals. The silicon-bonded hydrogen atom-containing polyorganosiloxane with the average unit formula (4) that has a non-straight-chain structure can be specifically exemplified by cyclic methylhydrogenpolysiloxane, cyclic methylhydrogensiloxane.dimethylsiloxane copolymer, tris(dimethylhydrogensiloxy)methylsilane, and tetra(dimethylhydrogensiloxy)silane. Other examples are the species provided by replacing a portion of the methyl groups in these polysiloxanes with another alkyl group or with phenyl group.

The molar ratio of the 1-alkenyl group in the charged 1-alkenyl methacrylate or 1-alkenyl acrylate with general formula (5) to the silicon-bonded hydrogen atoms in the polyorganosiloxane with the average unit formula (4) or average structural formula (6) is preferably 1.0 to 2.0, more preferably 1.0 to 1.5, and even more preferably 1.0 to 1.2.

The hydrosilylation reaction catalyst is generally a catalyst that can be used for the hydrosilylation reaction, but is not otherwise particularly limited; however, platinum-based catalysts and rhodium-based catalysts are desirable from the standpoint of catalytic activity.

The platinum-based catalysts can be specifically exemplified by chloroplatinic acid, alcohol-modified chloroplatinic acid, chloroplatinic acid-vinylsiloxane complexes, olefin complexes of chloroplatinic acid, chloroplatinic acid/β-diketone complexes, platinum/vinylsiloxane complexes, olefin complexes of platinum, and β-diketone complexes of platinum. Viewed from the perspective of the reaction-accelerating activity, chloroplatinic acid, platinum/vinylsiloxane complexes, and olefin complexes of platinum are preferred, while chloroplatinic acid/divinyltetramethyldisiloxane complexes, chloroplatinic acid/tetramethyltetravinylcyclotetrasiloxane complexes, and platinum/vinylsiloxane complexes such as platinum/divinyltetramethyldisiloxane complexes, platinum/tetramethyltetravinylcyclotetrasiloxane complexes, and so forth, are particularly preferred.

As the rhodium-based catalysts, there are rhodium-based catalysts represented by $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX_3[(R^6)_2S]_3$, $(R^7{}_3P)_2Rh(CO)X$, $(R^7{}_3)_2Rh(CO)H$, $Rh_2X_2Y_4$, $H_aRh_b(E)_cCl_d$, or $Rh[O(CO)R]_{3-n}$ (OH)$_n$ wherein X is a hydrogen atom, chlorine atom, bromine atom, or iodine atom; Y is alkyl, CO, or $C_8H_{14}$; $R^6$ is alkyl, cycloalkyl, or aryl; $R^7$ is alkyl, aryl, alkyloxy, or aryloxy; E is an olefin; a is 0 or 1; b is 1 or 2, c is an integer from 1 to 4; d is 2, 3, or 4; and n is 0 or 1.

The catalyst may be used in this hydrosilylation reaction in a so-called catalytic quantity, or 0.5 to 50 ppm and preferably 1 to 20 ppm for the quantity of platinum per se or rhodium per se with reference to the total quantity of the reaction starting materials.

The temperature and time of this addition reaction are suitably approximately 600 minutes to 30 minutes at from ambient temperature to 140° C., but the temperature and time may as necessary be outside these ranges.

This addition reaction may as necessary be run in an organic solvent. This organic solvent can be exemplified by aliphatic alcohols such as methanol, ethanol, 2-propanol, butanol, and so forth; aromatic hydrocarbons such as toluene, xylene, and so forth; aliphatic and alicyclic hydrocarbons such as n-pentane, n-hexane, cyclohexane, and so forth; and halogenated hydrocarbons such as dichloromethane, chloroform, carbon tetrachloride, and so forth.

A post-treatment may be performed in order to complete the hydrosilylation reaction of the silicon-bonded hydrogen atoms in the polyorganosiloxane with the average unit formula (4) or average structural formula (6), i.e., to completely extinguish the silicon-bonded hydrogen atoms. This post-treatment can be carried out, for example, by the following methods: addition reaction of the residual silicon-bonded hydrogen atoms with a compound that has a double bond, e.g., 1-hexene; adding a base, e.g., sodium hydroxide, to the reaction mixture in order to bring about a dehydrogenative condensation reaction between the silicon-bonded hydrogen atoms.

The addition reaction under consideration may be run using a batch or continuous regime. A suitable method in the case of the continuous regime is to run the addition reaction in a cylindrical reactor that contains a stirring means combined with a means for maintaining plug flow, as proposed in JP 2001-294666 A.

In the particular case of the use of an organic solvent, the novel methacryloxy group- or acryloxy group-containing polyorganosiloxane of the present invention is obtained by following the previously described post-treatment with removal of the low boilers, e.g., the organic solvent and so forth, by heating under reduced pressure.

The methacryloxy or acryloxy-poly(alkyleneoxy)alkyl group-containing polyorganosiloxane of the present invention is characteristically represented by the average unit formula (7)

$$R^4_a R^2_b SiO_{(4-a-b)/2} \quad (7)$$

wherein $R^4$ is a methacryloxy or acryloxy-poly(alkyleneoxy) alkyl group represented by general formula (8)

$$X-(Y)_c-Z^1- \quad (8)$$

wherein X is a methacryloxy group or acryloxy group, Y is an alkyleneoxy group having 2 to 6 carbon atoms, c is a number greater than or equal to 1 and less than or equal to 20, and $Z^1$ is a divalent alkylene group having 6 to 20 carbon atoms, with the proviso that the total number of carbons in $(Y)_c-Z^1$ is at least 11; $R^2$ is a monovalent hydrocarbyl group that does not contain an aliphatically unsaturated bond; a is $0.001 \leq a \leq 1.5$; b is $1.0 \leq b \leq 2.5$; and $1.001 \leq a+b \leq 3$.

In the present invention, the methacryloxy or acryloxy-poly(alkyleneoxy)alkyl group denotes the methacryloxypoly (alkyleneoxy)alkyl group or acryloxypoly(alkyleneoxy)alkyl group.

$R^4$ in the average unit formula (7) is a silicon-bonded methacryloxy or acryloxy-poly(alkyleneoxy)alkyl group represented by general formula (8)

$$X-(Y)_c-Z^1- \quad (8)$$

wherein X is a methacryloxy group or acryloxy group, Y is an alkyleneoxy group having 2 to 6 carbon atoms, c is a number greater than or equal to 1 and less than or equal to 20, and $Z^1$ is a divalent alkylene group having 6 to 20 carbon atoms, with the proviso that the total number of carbon atoms in $(Y)_c-Z^1$ is at least 11.

Y in $X-(Y)_c-Z^1-$ is an alkyleneoxy group having 2 to 6 carbon atoms. This alkyleneoxy group can be exemplified by ethyleneoxy, propyleneoxy, butyleneoxy, pentyleneoxy, and hexyleneoxy, wherein ethyleneoxy and then propyleneoxy being preferred.

c is a number greater than or equal to 1 and less than or equal to 20 and preferably is a number greater than or equal to 1 and less than or equal to 10.

$Z^1$ is an alkylene group having 6 to 20 carbon atoms. The molecular configuration of this alkylene group is preferably a straight-chain configuration, but may be a branched-chain configuration.

This alkylene group can be exemplified by hexylene, heptylene, octylene, nonylene, decylene, undecylene, dodecylene, tridecylene, tetradecylene, pentadecylene, hexadecylene, heptadecylene, octadecylene, nonadecylene, and eicosanylene. The undecylene group is preferred from the standpoint of the ease of acquisition of the synthesis starting materials.

The total number of carbon atoms in $(Y)_c-Z^1$, however, is at least 11 based on a consideration of the resin-modifying effect of the copolymer with another vinylic monomer.

$R^2$ is a silicon-bonded monovalent hydrocarbyl group that does not contain an aliphatically unsaturated bond. This monovalent hydrocarbyl group lacking an aliphatically unsaturated bond can be exemplified by alkyl groups such as methyl, ethyl, propyl, butyl, hexyl, and so forth; aryl groups such as phenyl, tolyl, xylyl, and so forth; and aralkyl groups such as benzyl, phenethyl, phenylpropyl, and so forth. Alkyl groups and the phenyl group are preferred from the standpoint of the ease of production and properties, while methyl is the most preferred.

a is $0.001 \leq a \leq 1.5$; b is $1.0 \leq b \leq 2.5$; and $1.001 \leq a+b \leq 3$. The $0.001 \leq a \leq 1.5$ means that on average at least one $R^1$ is bonded per 1,000 silicon atoms in the polyorganosiloxane and that on average not more than 1.5 $R^1$ groups are bonded per silicon atom in the polyorganosiloxane. The $1.0 \leq b \leq 2.5$ means that on average at least one $R^2$ is bonded per silicon atom in the polyorganosiloxane and that on average not more than 2.5 $R^2$ groups are bonded per silicon atom in the polyorganosiloxane. The $1.001 \leq a+b \leq 3$ means that on average at least 1.001 $R^1$ and $R^2$ groups are bonded per silicon atom in the polyorganosiloxane and that on average not more than 3.0 $R^1$ and $R^2$ groups are bonded per silicon atom in the polyorganosiloxane. The polyorganosiloxane has a straight-chain molecular structure when a+b=2, and it is a dimer when a+b=3. The degree of branching in the polyorganosiloxane grows larger as a+b declines from 2 to 1, and a polysilsesquioxane is obtained at a+b=1. Viewed from the perspective of the copolymerizability with another vinylic monomer and the resin-modifying effect of the copolymer with another vinylic monomer, a is less than or equal to b and 1.7≤a+b≤3.0 is preferred and 1.9≤a+b≤3.0 is more preferred.

The molecular structure of this polyorganosiloxane is not particularly limited and may be straight chain, a moderately branched straight chain, branched, or cyclic, while a polyorganosiloxane represented by the following average structural formula (9) is preferred from the standpoint of the resin-modifying effect of the copolymer with another vinylic monomer

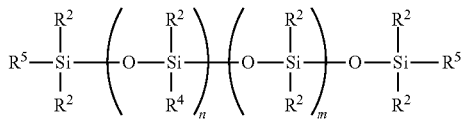

wherein $R^4$ is a methacryloxy or acryloxy-poly(alkyleneoxy)alkyl group represented by general formula (8)

wherein X is a methacryloxy group or acryloxy group, Y is an alkyleneoxy group having 2 to 6 carbon atoms, c is a number greater than or equal to 1 and less than or equal to 20, and $Z^1$ is an alkylene group having 6 to 20 carbon atoms, with the proviso that the total number of carbon atoms in $(Y)_c—Z^1$ is at least 11; $R^2$ is a monovalent hydrocarbyl group that does not contain an aliphatically unsaturated bond; $R^5$ is $R^2$ or $R^4$; $R^5$ is $R^4$ when n is 0; n is a number greater than or equal to 0 and less than or equal to 50; and m is a number greater than or equal to 1 and less than or equal to 10,000.

n in the average structural formula (9) is a number greater than or equal to 0 and less than or equal to 50, and is preferably from 1 to 3 from the standpoint of the resin-modifying effect of the copolymer with another vinylic monomer. m is a number greater than or equal to 1 and less than or equal to 10,000, and, viewed from the perspective of the ease of production of the starting silicon-bonded hydrogen atom-containing polyorganosiloxane, m is preferably greater than or equal to 1 and less than or equal to 1,000 and more preferably is greater than or equal to 1 and less than or equal to 100.

When n is 0 and the two $R^5$ groups at the two terminals are both $R^4$, the methacryloxy group- or acryloxy group-containing polyorganosiloxane is then a polydiorganosiloxane in which a methacryloxy or acryloxy-poly(alkyleneoxy)alkyl group is bonded at both terminals. When n is greater than or equal to 1 and less than or equal to 50, the methacryloxy group- or acryloxy group-containing polyorganosiloxane is then a polydiorganosiloxane in which a methacryloxy or acryloxy-poly(alkyleneoxy)alkyl group is bonded at least in side chain position.

When n in the average structural formula (9) is 0 and one of the two $R^5$ groups at the two terminals is $R^4$ and the other is $R^2$, the methacryloxy group- or acryloxy group-containing polyorganosiloxane is then a macromonomer having the form of a polydiorganosiloxane in which a methacryloxy or acryloxy-poly(alkyleneoxy)alkyl group is bonded at one terminal and is one species of the polyorganosiloxane represented by the average unit formula (7).

Viewed from the perspective of the resin-modifying effect of the copolymer with another vinylic monomer, the polydiorganosiloxane in which a methacryloxy or acryloxy-poly(alkyleneoxy)alkyl group is bonded at both terminals and the polydiorganosiloxane in which a methacryloxy or acryloxy-poly(alkyleneoxy)alkyl group is bonded at least in side chain position are preferred.

The methacryloxy or acryloxy-poly(alkyleneoxy)alkyl group-containing polyorganosiloxane represented by the average unit formula (7) can be produced by executing an addition reaction between
a silicon-bonded hydrogen atom-containing polyorganosiloxane represented by the average unit formula (4)

wherein $R^2$ is a monovalent hydrocarbyl group that does not contain an aliphatically unsaturated bond, a is 0.001≤a≤1.5, b is 1.0≤b≤2.5, and 1.001≤a+b≤3
and
a 1-alkenyloxypolyalkylene glycol methacrylate or 1-alkenyloxypolyalkylene glycol acrylate represented by general formula (10)

wherein X is a methacryloxy group or acryloxy group, Y is an alkyleneoxy group having 2 to 6 carbon atoms, c is a number greater than or equal to 1 and less than or equal to 20, and $W^1$ is a 1-alkenyl group having 6 to 20 carbon atoms in the presence of a hydrosilylation reaction catalyst.

The Y in $X—(Y)_c—W^1$ is an alkyleneoxy group having 2 to 6 carbon atoms. This alkyleneoxy group can be exemplified by ethyleneoxy, propyleneoxy, butyleneoxy, pentyleneoxy, and hexyleneoxy, wherein ethyleneoxy and then propyleneoxy are preferred. c is a number greater than or equal to 1 and less than or equal to 20 and preferably is a number greater than or equal to 1 and less than or equal to 10.

$W^1$ is a 1-alkenyl group having 6 to 20 carbon atoms. The molecular configuration of this 1-alkenyl group is preferably a straight-chain configuration, but may be a branched-chain configuration.

$W^1$ can be exemplified by 1-hexenyl, 1-heptenyl, 1-octenyl, 1-nonenyl, 1-decenyl, 1-undecenyl, 1-dodecenyl, 1-tridecenyl, 1-tetradecenyl, 1-pentadecenyl, 1-hexadecenyl, 1-heptadecenyl, 1-octadecenyl, 1-nondecenyl, and 1-eicosenyl. $W^1$ is preferably the 1-undecenyl group viewed from the standpoint of the ease of acquisition of a 1-alkenyl methacrylate or 1-alkenyl acrylate.

The methacryloxy or acryloxy-poly(alkyleneoxy)alkyl group-containing polyorganosiloxane with the average structural formula (9)

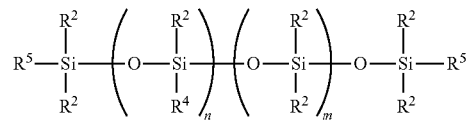

wherein $R^4$ is a methacryloxypoly(alkyleneoxy)alkyl group or acryloxypoly(alkyleneoxy)alkyl group represented by general formula (8)

wherein X is a methacryloxy group or acryloxy group, Y is an alkyleneoxy group having 2 to 6 carbon atoms, c is a number greater than or equal to 1 and less than or equal to 20, and $Z^1$ is an alkylene group having 6 to 20 carbon atoms, with the proviso that the total number of carbon atoms in $(Y)_c$—$Z^1$ is at least 11; $R^2$ is a monovalent hydrocarbyl group that does not contain an aliphatically unsaturated bond; $R^5$ is $R^2$ or $R^4$; $R^5$ is $R^4$ when n is 0; n is a number greater than or equal to 0 and less than or equal to 50; and m is a number greater than or equal to 1 and less than or equal to 10,000 can be produced by executing an addition reaction, in the presence of a hydrosilylation reaction catalyst, between a silicon-bonded hydrogen atom-containing polyorganosiloxane represented by the average structural formula (6)

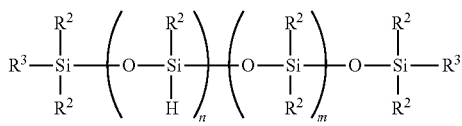

wherein $R^2$ is a monovalent hydrocarbyl group that does not contain an aliphatically unsaturated bond, $R^3$ is $R^2$ or a hydrogen atom, $R^3$ is a hydrogen atom when n is 0, n is a number greater than or equal to 0 and less than or equal to 50, and m is a number greater than or equal to 1 and less than or equal to 10,000, and a 1-alkenyloxypolyalkylene glycol methacrylate or 1-alkenyloxypolyalkylene glycol acrylate represented by general formula (10)

wherein X is a methacryloxy group or acryloxy group, Y is an alkyleneoxy group having 2 to 6 carbon atoms, c is a number greater than or equal to 1 and less than or equal to 20, $W^1$ is a 1-alkenyl group having 6 to 20 carbon atoms, and the total number of carbon atoms in $(Y)_c$—$W^1$ is at least 11.

The silicon-bonded hydrogen atom-containing polyorganosiloxane with the average structural formula (6) is as already described in paragraphs [0033] to [0036].

The Y, c, and $W^1$ in X—$(Y)_c$—$W^1$ are as already described in paragraphs [0058] and [0059].

The molar ratio of the 1-alkenoxy group in the charged 1-alkenyloxypolyalkylene glycol methacrylate or 1-alkenyloxypolyalkylene glycol acrylate with general formula (10) to the silicon-bonded hydrogen atoms in the polyorganosiloxane with the average unit formula (4) or average structural formula (6) is preferably 1.0 to 2.0, more preferably 1.0 to 1.5, and even more preferably 1.0 to 1.2.

The type of hydrosilylation reaction catalyst, the quantity of hydrosilylation reaction catalyst use, the addition reaction temperature, the addition reaction time, the use of organic solvent, the post-treatment, and the removal of low boilers are as already described in paragraphs [0038] to [0046].

The inventive methacryloxyalkyl group- or acryloxyalkyl group-containing polyorganosiloxane with the average unit formula (1) and the polyorganosiloxanes that are its embodiments, for example, the methacryloxyalkyl group- or acryloxyalkyl group-containing polyorganosiloxane with the average structural formula (3), when made into a copolymer with a vinylic monomer that can copolymerize with the methacryl or acryl group, i.e., a copolymer with a radically polymerizable monomer or a copolymer with an anionically polymerizable monomer, are useful as internal modifying agents for thermoplastic resins.

Vinylic monomers that are copolymerizable with the methacryl or acryl group can be exemplified by ethylene, isobutylene, tetrafluoroethylene, butadiene, styrene, acrylonitrile, methacrylate esters, chloroprene, vinyl acetate, vinyl chloride, acrylic acid, and methacrylic acid. However, the copolymerizability of these monomers with the methacryl group or acryl group requires a thorough analysis in practice.

The inventive methacryloxy or acryloxy-poly(alkyleneoxy)alkyl group-containing polyorganosiloxane with the average unit formula (7) and the polyorganosiloxanes that are its embodiments, for example, the methacryloxypoly(alkyleneoxy)alkyl group- or acryloxypoly(alkyleneoxy)alkyl group-containing polyorganosiloxane with the average structural formula (9), when made into a copolymer with a vinylic monomer that can copolymerize with the methacryl or acryl group, i.e., a copolymer with a radically polymerizable monomer or a copolymer with an anionically polymerizable monomer, are useful as internal modifying agents for thermoplastic resins.

The thermoplastic resins that may be subjected to this internal modification can be exemplified by polyethylene, polypropylene, polyvinyl chloride, polyvinylidene chloride, polystyrene, polyvinyl acetate, polytetrafluoroethylene, ABS resin, acrylic resin, polyamide, polyacetal, polycarbonate, polybutylene terephthalate, polyethylene terephthalate, PPS, polysulfone, polyether sulfone, PEEK, polyimide, and polyamideimide. The solubility parameter of the copolymer with a radically polymerizable monomer or the copolymer with an anionically polymerizable monomer must be as close as possible to the solubility parameter of the resin to be modified.

EXAMPLES

Infrared absorption analysis (abbreviated as IR analysis) was performed by the liquid film method using an FT/IR4100 from the JASCO Corporation. Nuclear magnetic resonance analysis (abbreviated as NMR analysis) was performed by $^{29}$Si-NMR and $^{13}$C-NMR. The $^{29}$Si-NMR measurements were performed in deuterated chloroform using tetramethylsilane as the internal standard and using a JNM-EX400 nuclear magnetic resonance instrument from JEOL. The $^{13}$C-NMR measurements were performed in deuterated chloroform using tetramethylsilane as the internal standard and using a JNM-EX400 nuclear magnetic resonance instrument from JEOL.

Example 1

20 g (SiH group: 22.3 mmol) of a polydimethylsiloxane endblocked at both terminals by dimethylhydrogensiloxy groups having an average degree of polymerization of 22.4, 10.2 g (24.5 mmol) of undecenyloxytetraethylene glycol methacrylate, and 0.003 g of dibutylhydroxytoluene (abbreviated below as BHT) were introduced into a three-neck flask fitted with a stirrer and thermometer and were mixed. A platinum/tetramethyldivinyldisiloxane complex was then introduced in an amount that provided 5 weight-ppm as the amount of platinum metal and mixing was carried out. When IR analysis was performed after stifling for 1 hour at 60° C. to 70° C., the absorption caused by the silicon-bonded hydrogen atom, i.e., the SiH group, was extinguished and the addition reaction had thus gone to completion. The results of the NMR analyses confirmed a polydimethylsiloxane having methacryloxytetra(ethyleneoxy)undecyl groups bonded at both terminals and having the following average structural formula. The yield was 100%.

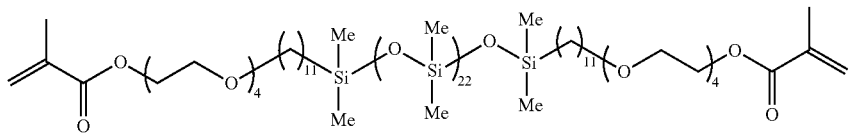

Example 2

20 g (SiH group: 22.3 mmol) of a polydimethylsiloxane endblocked at both terminals by dimethylhydrogensiloxy groups having an average degree of polymerization of 22.4, 0.003 g of BHT, and a platinum/tetramethyldivinyldisiloxane complex in an amount that provided 5 weight-ppm as the amount of platinum metal were introduced into a three-neck flask fitted with a stirrer and thermometer and were mixed. Heating to 50° C. was performed; 5.8 g (24.5 mmol) of undecenyl methacrylate was added dropwise; and this was followed by stirring for 2 hours at 60° C. to 80° C. When IR analysis was then run, the absorption caused by the silicon-bonded hydrogen atom, i.e., the SiH group, was extinguished and the addition reaction had thus gone to completion. The results of the NMR analyses confirmed a polydimethylsiloxane having methacryloxyundecyl groups bonded at both terminals and having the following average structural formula. The yield was 100%.

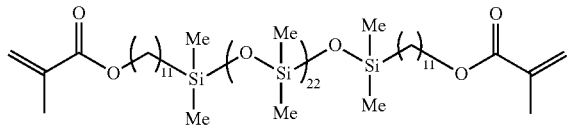

Example 3

50 g (SiH group: 12.9 mmol) of a polydimethylsiloxane endblocked at both terminals by dimethylhydrogensiloxy groups having an average degree of polymerization of 102, 3.4 g (14.2 mmol) of undecenyl methacrylate, 0.005 g of BHT, and a platinum/tetramethyldivinyldisiloxane complex in an amount that provided 5 weight-ppm as the amount of platinum metal were introduced into a three-neck flask fitted with a stirrer and thermometer and were mixed. When IR analysis was performed after stirring for 2 hours at 60° C. to 80° C., the absorption caused by the silicon-bonded hydrogen atom, i.e., the SiH group, was extinguished and the addition reaction had thus gone to completion. The results of the NMR analyses confirmed a polydimethylsiloxane having methacryloxyundecyl groups bonded at both terminals and having the following average structural formula. The yield was 100%.

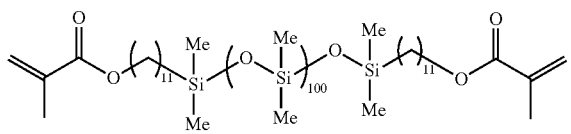

Example 4

20 g (SiH group: 10.1 mmol) of a dimethylsiloxane-methylhydrogensiloxane copolymer having the following average structural formula

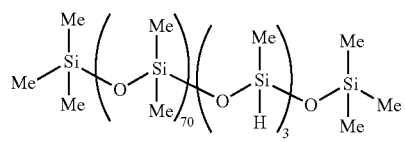

3.1 g (13.1 mmol) of undecenyl methacrylate, 0.005 g of BHT, and a platinum/tetramethyldivinyldisiloxane complex in an amount that provided 10 weight-ppm as the amount of platinum metal were introduced into a three-neck flask fitted with a stirrer and thermometer and were mixed. When IR analysis was performed after stirring for 4 hours at 100 to 140° C., the absorption caused by the silicon-bonded hydrogen atom, i.e., the SiH group, was extinguished and the addition reaction had thus gone to completion. The results of the NMR analyses confirmed a polydimethylsiloxane having methacryloxyundecyl groups bonded in side chain position and having the following average structural formula. The yield was 100%.

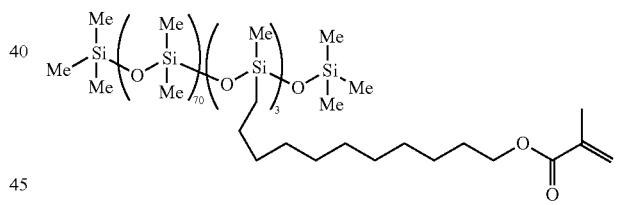

Example 5

561.9 g (717.6 mmol) of undecenyldodecaoxyethylene methacrylate and a platinum/tetramethyldivinyldisiloxane complex in an amount that provided 7 weight-ppm platinum metal with reference to the reaction mixture were introduced into a four-neck flask fitted with a stirrer and thermometer. Heating to 70° C. was performed; 573.4 g (SiH group: 653.8 mmol) of a polydimethylsiloxane endblocked at both terminals by dimethylhydrogensiloxy groups having an average degree of polymerization of 22 was added dropwise; and this was followed by stirring for 8 hours at 70° C. to 80° C. When IR analysis was then run, the absorption caused by the silicon-bonded hydrogen atom, i.e., the SiH group, was extinguished and the addition reaction had thus gone to completion. The results of the NMR analyses confirmed a polydimethylsiloxane having methacryloxydodecaethyleneoxyundecyl groups bonded at both terminals and having the following average structural formula. The yield was 100%.

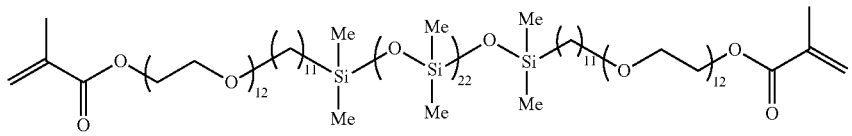

Comparative Example 1

75 g (594.5 millimol) of allyl methacrylate and 0.05 g of 3,5-di-tert-butyl-4-hydroxyphenylmethyldimethylammonium chloride were introduced into a four-neck flask fitted with a stirrer and a thermometer. A platinum/1,1,3,3-tetramethyl-1,3-divinyldisiloxane complex was then introduced in an amount that provided 5 weight-ppm platinum metal with reference to the allyl methacrylate and stirring was performed. This system was heated to 95° C. under a nitrogen atmosphere containing 2% oxygen and a small amount of 1,1,3,3-tetramethyldisiloxane was added dropwise. After confirmation that the hydrosilylation reaction had started, a total of 33.2 g (247.7 millimol) of 1,1,3,3-tetramethyldisiloxane was added dropwise while maintaining a reaction temperature of 90 to 100° C. by insulating the system or water cooling or air cooling of the system. Stirring was carried out for 1 hour at 85° C. to 100° C. after the completion of the dropwise addition, and when IR analysis was then run, the absorption caused by the silicon-bonded hydrogen atom, i.e., the SiH group, had been extinguished. 76.6 g of an addition-reaction product was then obtained by distilling off the low boilers by heating under reduced pressure. According to the results of gas chromatographic and NMR analyses, the products in this addition-reaction product were 1,3-di(methacryloxypropyl)tetramethyldisiloxane:1-methacryloxypropyl-3-methacryloxytetramethyldisiloxane:1,3-di(methacryloxy)tetramethyldisiloxane in a weight ratio of approximately 50:44:6.

INDUSTRIAL APPLICABILITY

The inventive methacryloxyalkyl group- or acryloxyalkyl group-containing polyorganosiloxane and the inventive methacryloxy or acryloxy-poly(alkyleneoxy)alkyl group-containing polyorganosiloxane are useful as monomers for copolymerization with another vinylic monomer, and their copolymers with another vinylic monomer are useful as internal modifying agents for resins and particularly thermoplastic resins.

The method of the present invention for producing a methacryloxyalkyl group- or acryloxyalkyl group-containing polyorganosiloxane and the method of the present invention for producing a methacryloxy or acryloxy-poly(alkyleneoxy) alkyl group-containing polyorganosiloxane are useful for the simple and convenient production of these polyorganosiloxanes in good yields.

The invention claimed is:

1. A methacryloxyalkyl group- or acryloxyalkyl group-containing polyorganosiloxane that is represented by the average structural formula (3)

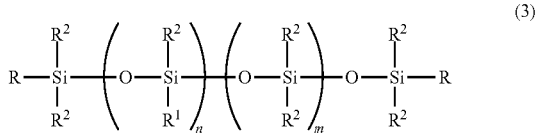

wherein $R^1$ is a methacryloxyalkyl group or acryloxyalkyl group represented by general formula (2)

$$X—Z— \quad (2)$$

wherein X is a methacryloxy group or acryloxy group and Z is an alkylene group having 11 to 20 carbon atoms; $R^2$ is a monovalent hydrocarbyl group that does not contain an aliphatically unsaturated bond; R is $R^1$; n is 0; and m is a number greater than or equal to 1 and less than or equal to 10,000.

2. The methacryloxyalkyl group- or acryloxyalkyl group-containing polyorganosiloxane according to claim 1, wherein Z in general formula (2) is an undecylene group.

3. A method of producing a methacryloxyalkyl group- or acryloxyalkyl group-containing polyorganosiloxane represented by the average structural formula (3)

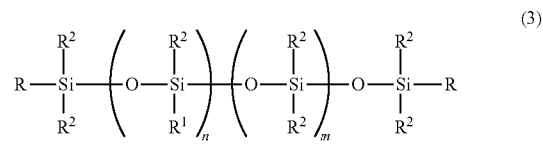

wherein $R^1$ is a methacryloxyalkyl group or acryloxyalkyl group represented by general formula (2)

$$X—Z— \quad (2)$$

wherein X is a methacryloxy group or acryloxy group and Z is an alkylene group having 11 to 20 carbon atoms; $R^2$ is a monovalent hydrocarbyl group that does not contain an aliphatically unsaturated bond; R is $R^1$; n is 0; and m is a number greater than or equal to 1 and less than or equal to 10,000, said method being characterized by executing an addition reaction between a silicon-bonded hydrogen atom-containing polyorganosiloxane represented by the average structural formula (6)

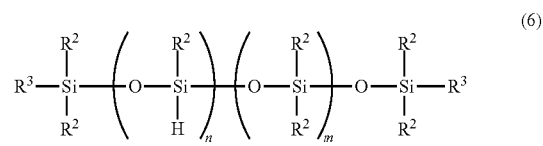

wherein $R^2$ is a monovalent hydrocarbyl group that does not contain an aliphatically unsaturated bond, $R^3$ is a hydrogen atom, n is 0, and m is a number greater than or equal to 1 and less than or equal to 10,000 and
a 1-alkenyl methacrylate or 1-alkenyl acrylate represented by general formula (5)

$$X—W \quad (5)$$

wherein X is a methacryloxy group or acryloxy group and W is a 1-alkenyl group having 11 to 20 carbon atoms in the presence of a hydrosilylation reaction catalyst.

4. The method according to claim 3 for producing a methacryloxyalkyl group- or acryloxyalkyl group-containing polyorganosiloxane, wherein W in general formula (5) is a 1-undecenyl group and Z in general formula (2) is an undecylene group.

\* \* \* \* \*